United States Patent
Zhang

(10) Patent No.: US 10,136,186 B2
(45) Date of Patent: Nov. 20, 2018

(54) SIGNAL PROCESSING METHOD, SIGNAL RECEPTION PROCESSING APPARATUS AND TV SYSTEM

(71) Applicant: BOE TECHNOLOGY GROUP CO., LTD., Beijing (CN)

(72) Inventor: Kailiang Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/427,050

(22) PCT Filed: Apr. 4, 2014

(86) PCT No.: PCT/CN2014/074829
§ 371 (c)(1),
(2) Date: Mar. 10, 2015

(87) PCT Pub. No.: WO2015/109662
PCT Pub. Date: Jul. 30, 2015

(65) Prior Publication Data
US 2016/0029083 A1    Jan. 28, 2016

(30) Foreign Application Priority Data
Jan. 26, 2014   (CN) .......................... 2014 1 0037929

(51) Int. Cl.
  *H04N 7/16*  (2011.01)
  *H04N 21/458*  (2011.01)
  (Continued)

(52) U.S. Cl.
  CPC ......... *H04N 21/458* (2013.01); *H04N 21/422* (2013.01); *H04N 21/42204* (2013.01);
  (Continued)

(58) Field of Classification Search
  CPC ............... H04N 21/458; H04N 21/422; H04N 21/42204; H04N 21/4325; H04N 21/4332;
  (Continued)

(56) References Cited

U.S. PATENT DOCUMENTS 4,768,229 A * 8/1988 Benjamin ............... H04N 7/162
                                                     348/E7.06
5,764,928 A * 6/1998 Lanctot ................... G06F 13/14
                                                     709/237
(Continued)

FOREIGN PATENT DOCUMENTS

CN        1705341 A      12/2005
CN      201018572 Y       2/2008
(Continued)

OTHER PUBLICATIONS

First Chinese Office Action dated Jul. 5, 2016; Appln. No. 201410037929.1.
(Continued)

*Primary Examiner* — Kyu Chae
(74) *Attorney, Agent, or Firm* — Ladas & Parry LLP

(57) ABSTRACT

There are disclosed a signal processing method, a signal reception processing apparatus and a TV system, wherein the signal processing method comprises: receiving a control signal and decoding said control signal; comparing a signal instruction obtained from the decoding with preset instructions and generating an execution instruction corresponding to the matched preset instruction, wherein said preset instructions include a channel storage instruction and a channel change instruction; and performing corresponding execution actions according to the execution instruction. In the signal reception processing apparatus and the TV system based on the above method, specific channels are stored by decoding the control signal, and thus by storing specific (Continued)

channels, the aged can perform operations only on these specific TV channels instead of all TV channels when watching TV programs, and therefore they can watch TV program conveniently.

20 Claims, 5 Drawing Sheets

(51) Int. Cl.
    *H04N 21/422* (2011.01)
    *H04N 21/462* (2011.01)
    *H04N 21/435* (2011.01)
    *H04N 21/438* (2011.01)
    *H04N 21/6543* (2011.01)
    *H04N 21/6547* (2011.01)
    *H04N 21/433* (2011.01)
    *H04N 21/4335* (2011.01)
    *H04N 21/432* (2011.01)

(52) U.S. Cl.
    CPC ....... *H04N 21/435* (2013.01); *H04N 21/4325* (2013.01); *H04N 21/4332* (2013.01); *H04N 21/4335* (2013.01); *H04N 21/4383* (2013.01); *H04N 21/462* (2013.01); *H04N 21/6543* (2013.01); *H04N 21/6547* (2013.01)

(58) Field of Classification Search
    CPC .. H04N 21/335; H04N 21/35; H04N 21/4383; H04N 21/462; H04N 21/6543; H04N 21/6547
    See application file for complete search history.

(56) References Cited

U.S. PATENT DOCUMENTS

| | | | |
|---|---|---|---|
| 2004/0080428 A1* | 4/2004 | Rye | G08C 17/02 340/12.22 |
| 2004/0178987 A1* | 9/2004 | Chen | G06F 3/033 345/156 |
| 2005/0008345 A1* | 1/2005 | Choi | H04N 21/4122 386/231 |
| 2008/0060019 A1 | 3/2008 | Shikata et al. | |
| 2008/0238712 A1* | 10/2008 | Thurmond | G01D 4/002 340/870.02 |
| 2008/0259220 A1* | 10/2008 | Stahulak | H04N 5/44543 348/734 |
| 2009/0025038 A1* | 1/2009 | Sahasrabudhe | H04N 5/50 725/50 |
| 2009/0295994 A1* | 12/2009 | Kojima | H04N 5/44504 348/553 |
| 2010/0333141 A1* | 12/2010 | Kang | H04N 5/4401 725/44 |
| 2011/0102158 A1 | 5/2011 | Haughawout et al. | |
| 2014/0082671 A1 | 3/2014 | Cheung | |

FOREIGN PATENT DOCUMENTS

| | | |
|---|---|---|
| CN | 1201440692 U | 4/2010 |
| CN | 102833503 A | 12/2012 |
| CN | 103281581 A | 9/2013 |
| CN | 103501445 A | 1/2014 |

OTHER PUBLICATIONS

International Search Report Appln. No. PCT/CN2014/074829: Dated Oct. 27, 2014.
Written Opinion of the International Searching Authority Appln. No. PCT/CN2014/074829; Dated Oct. 27, 2014.
Second Chinese Office Action dated Nov. 30, 2016; Appln. No. 201410037929.1.
The Third Chinese Office Action dated Oct. 26, 2017; Appln. 201410037929.1.

* cited by examiner

SIGNAL PROCESSING METHOD, SIGNAL RECEPTION PROCESSING APPARATUS AND TV SYSTEM

TECHNICAL FIELD

The present disclosure relates to a field of Television (TV) technique, and in particular, to a signal processing method, a signal reception processing apparatus and a TV system.

BACKGROUND

In recent years, TV technique gets updated gradually with the development of technology, with which the contents of TV programs also become richer and richer. The requirements for TV set are not only in terms of high definition, but also include networking and intellectualization of TV set. Especially after the introduction of smart TV sets, there are more and more the functions for a TV set, in addition to the function for watching and searching TV channels, the functions such as recording TV programs, being able to play satellite and cable TV programs as well as network videos and so on, are provided, which are more smart and friendly.

But meanwhile the operations for a smart TV are increasingly difficult, which are no longer the simple operations like channel change and volume adjustment, and thus many keys with specific functions are provided on a remote controller for TV. Young people can be proficient in these complicated operations through referring to the manuals and simple learning, whereas it takes a long time for the aged to learn and even so, it is still hard for them to become proficient, thereby hampering the aged to watch and use TV. Moreover, although the number of the TV channels is relatively high at present, whose channel number may range from 1 to tens, or even to hundreds, most of those TV channels are seldom watched by the aged, which are unnecessary to the aged and meanwhile increase the burden of remote control for them. In particular, people are required to press the numbers corresponding to these channels on the remote control apparatus when it is desired to switch channels. For example, when it is desired to switch from the current channel to the channel of " Satellite TV" with channel number 56, for most of current remote controller, it needs to press keys "5" and "6" sequentially on the keys, and it is required to press key "6" within a certain period after key "5" is pressed (for example, 0~3 seconds) so as to switch the channel of " Satellite TV" with channel number 56 successfully. However, due to the visual attenuation, the aged cannot discern the dense press key functions on the TV remote control apparatus, which makes the operations more difficult, and the process of pressing keys also becomes relatively slow, incapable of pressing the key of the second number within the required time period. That is, failing to press key "6" within 3 seconds after key "5" is pressed may result that the number "5" is recognized automatically as the target channel number to switch into, and the successful switching to channel number 56 cannot be achieved.

To summarize, the manner in which the channel switching for TV set is controlled by the existing remote control apparatus to play programs is relatively complicated for the aged and inconvenient to use and operate.

SUMMARY

1. Technical Problem to be Solved

Regarding to the above disadvantages, the technical problem to be solved by the present disclosure is how to process a control signal sent by a remote control apparatus to enable the latter to store specific channels without requiring the aged to operate on all TV channels so that the aged can watch TV programs conveniently.

2. Technical Solution

In order to solve the above problem, an embodiment of the present disclosure provides a signal processing method, including the following steps:

receiving a control signal and decoding said control signal;

comparing a signal instruction obtained from the decoding with preset instructions and generating an execution instruction corresponding to a preset instruction as matched, wherein said preset instructions include a channel storage instruction and a channel change instruction; and performing a corresponding execution action according to the execution instruction.

Further, said comparing a signal instruction obtained from the decoding with preset instructions and generating an execution instruction corresponding to the preset instruction as matched particularly includes:

generating an execution instruction for storing channel information if the signal instruction obtained from the decoding corresponds to the channel storage instruction; and reading channel information of previous channel or next channel of current channel from a storage list and generating an execution instruction for changing channels, if the signal instruction obtained from the decoding corresponds to the channel change instruction, wherein said channel change instruction includes channel increasing instruction and channel decreasing instruction.

Further, said generating an execution instruction for storing channel information particularly includes:

storing the channel information in form of a storage list when the number of stored channel information is larger than 2, and in said storage list, arranging the channel information in an order of the adding sequence and labeling the channel information with numbers.

Further, said reading channel information of previous channel or next channel of current channel from a storage list and generating an execution instruction for changing channels particularly includes:

reading channel information of next channel of current channel from the storage list and generating an execution instruction for channel increasing, if said channel change instruction is the channel increasing instruction; and reading channel information of previous channel of current channel from the storage list and generating an execution instruction for channel decreasing, if said channel change instruction is the channel decreasing instruction.

Further, said preset instructions include a channel sequence moving instruction.

Further, said comparing a signal instruction obtained from the decoding with preset instructions and generating an execution instruction corresponding to the preset instruction as matched particularly includes:

generating an execution instruction for adjusting current channel sequence in the storage list if the signal instruction obtained from the decoding corresponds to the channel sequence moving instruction, wherein said channel sequence moving instruction includes a channel moving upward instruction and a channel moving downward instruction.

Further, said generating an execution instruction for adjusting current channel sequence in the storage list particularly includes:

generating an execution instruction for moving current channel information sequence in the storage list upward one level if the signal instruction obtained from the decoding corresponds to the channel moving upward instruction; and generating an execution instruction for moving current channel information sequence in the storage list downward one level if the signal instruction obtained from the decoding corresponds to the channel moving downward instruction.

Further, said preset instructions include a channel deleting instruction.

Further, said comparing a signal instruction obtained from the decoding with preset instructions and generating an execution instruction corresponding to the preset instruction as matched particularly includes:

generating an execution instruction for deleting channel information in the storage list if the signal instruction obtained from the decoding corresponds to the channel deleting instruction.

In order to solve the above problem, an embodiment of the present disclosure further provides a signal reception processing apparatus, including a receiving module, a decoding module, a judgment module, a processing module and an execution module;

wherein said receiving module is configured to receive a control signal;

said decoding module is configured to decode said control signal;

said judgment module is configured to compare a signal instruction obtained from the decoding with preset instructions and then to send information obtained by the comparison to the processing module, wherein said preset instructions include a channel storage instruction and a channel change instruction;

said processing module is configured to receive the information sent by the judgment module and generate an execution instruction corresponding to the matched preset instruction, and to send said execution instruction to the execution module; and said execution module is configured to execute a corresponding execution action after receiving the execution instruction sent by the processing module.

Further, said processing module includes a channel storage unit and a channel change unit;

wherein said channel storage unit is configured to generate an execution instruction for storing channel information according to information corresponding to a channel storage instruction of the preset instructions sent by the judgment module, and to send the same to the execution module;

said channel change unit is configured to read channel information of previous channel or next channel of current channel from a storage list and to generate an execution instruction for changing channels according to information corresponding to a channel change instruction of the preset instructions sent by the judgment module, and to send the same to the execution module, wherein the channel change instruction includes a channel increasing instruction and a channel decreasing instruction.

Further, said channel storage unit is configured to generate a storage list, and to store the channel information in form of the storage list when the number of stored channel information is larger than 2, wherein, in said storage list, the channel information is arranged in an order of the adding sequence and is labeled with numbers.

Further, said channel change unit is configured to:

read channel information of next channel of current channel from the storage list if the channel change instruction is a channel increasing instruction, and send the channel information of said next channel to the execution module; and read channel information of previous channel of current channel from the storage list if channel change instruction is a channel decreasing instruction, and send the channel information of said previous channel to the execution module.

Further, said preset instructions include a channel sequence moving instruction.

Further, said processing module includes a channel sequence moving unit;

said channel sequence moving unit is configured to generate an execution instruction for adjusting current channel sequence in the storage list according to information corresponding to a channel sequence moving instruction in the preset instructions sent by the judgment module, and to send the same to the execution module, wherein said channel sequence moving instruction includes a channel moving upward instruction and a channel moving downward instruction.

Further, said channel sequence moving unit is configured to:

generate an execution instruction for moving current channel information sequence in the storage list upward one level if the channel sequence moving instruction is a channel moving upward instruction, and send the same to the execution module; and generate an execution instruction for moving current channel information sequence in the storage list downward one level if the channel sequence moving instruction is a channel moving downward instruction, and send the same to the execution module.

Further, said preset instructions include a channel deleting instruction.

Further, said processing module includes a channel deleting unit;

wherein said channel deleting unit is configured to generate an execution instruction for deleting channel information in the storage list according to information corresponding to a channel deleting instruction in the preset instructions sent by the judgment module, and to send the same to the execution module.

In order to solve the above problem, an embodiment of the present disclosure further provides a TV system including a TV set, and said TV set includes the signal reception processing apparatus described above, wherein said TV set executes execution instructions corresponding to control signals via said signal reception processing apparatus to control channels.

Further, said TV set includes a remote control apparatus, wherein said remote control apparatus is configured to send control signal to the TV set.

Further, said remote control apparatus matches the TV set described above, including a casing and a key array on the casing, said key array being divided into a usage area and a storage area, wherein the storage area includes a search key, a store key, a confirm key and a cancel key.

Further, the storage area of said remote control apparatus includes a delete key.

Further, a sliding cover is provided above the storage area, wherein the sliding cover is far away the storage area by sliding in a storage mode, while in a usage mode, the sliding cover slides above the storage area and shields the keys in the storage area.

Further, said key array includes mode switching key for realizing the switching between the storage mode and the usage mode.

3. Advantageous Effects

In the signal processing method, the signal reception processing apparatus and the TV set provided by the embodiments of the present disclosure, specific channels can be stored so that the aged can operate only these specific TV channels instead of all TV channels when watching TV programs, and therefore the aged are enabled to watch TV programs conveniently.

DETAILED DESCRIPTION

A detailed description will be further made to the embodiments of the present disclosure in connection with the appended drawings. The embodiments below are for describing the present disclosure, instead of limiting the scope of the present disclosure.

First Embodiment

Figure 1:
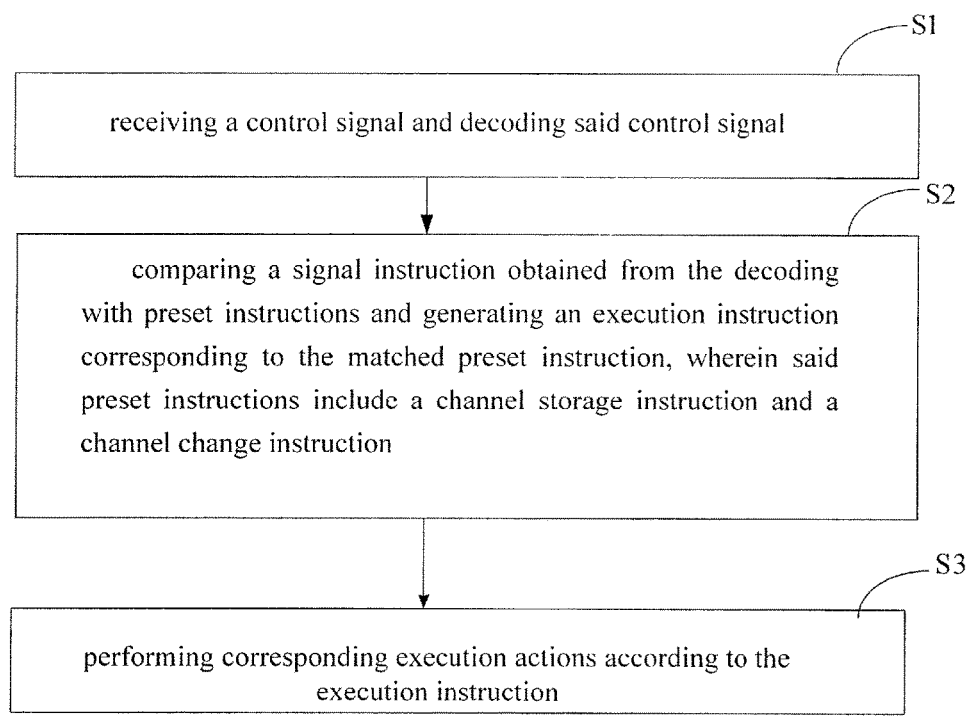
FIG. 1 is a flow chart for the steps of a signal processing method provided by a first embodiment of the present disclosure.

The first embodiment of the present disclosure provides a signal processing method, whose step process is illustrated in FIG. 1 and in particular includes the following:

Step S1: receiving a control signal and decoding said control signal;

Step S2: comparing a signal instruction obtained from the decoding with the preset instructions and generating an execution instruction corresponding to the preset instruction as matched, wherein the preset instructions include a channel storage instruction and a channel change instruction; and Step S3: performing corresponding execution actions according to the execution instruction.

In the signal processing method described above, the control signal sent from the remote control apparatus is decoded, the signal instruction obtained from the decoding is compared with the preset instructions, a corresponding execution instruction is generated according to the comparison result, and finally corresponding operations are performed according to the execution instruction, wherein the preset instructions includes a channel storage instruction and a channel change instruction; the specific channels can thus be stored so that the aged can just operate on these specific TV channels instead of all TV channels when watching TV programs, and thus it is convenient for the aged to watch TV programs.

Optionally, in the embodiment, comparing the signal instruction obtained from the decoding with preset instructions and generating an execution instruction corresponding to the preset instruction as matched particularly includes:

generating an execution instruction for storing channel information if the signal instruction obtained from the decoding corresponds to the channel storage instruction; and reading channel information of previous channel or next channel of current channel from a storage list and generating an execution instruction for changing channels, if the signal instruction obtained from the decoding corresponds to the channel change instruction, wherein changing channels relates to channel increasing or decreasing, and therefore said channel change instruction includes a channel increasing instruction and a channel decreasing channel. Thus, it can be judged by the above steps whether the purpose of the signal instruction obtained from the decoding is to store the channels or to increase/decrease the channel number, and a corresponding instruction is generated; moreover, the aged can change the channel to the previous channel or the next channel for the specific TV channels, instead of changing all TV channels; in a way of changing channels one by one, storing the specific channel described above is used, that is, the aged can store the channels they frequently watch, and the time required for changing these frequently-watched channels in the storage list will be less than that for changing all channels.

Optionally, in the above step, generating the execution instruction for storing channel information particularly includes:

storing the channel information in form of a storage list when the number of stored channel information is larger than 2, and in said storage list, wherein the channel information is arranged in sequence according to the order of adding sequence and is labeled with numbers. It is more convenient for the aged to operate on the TV channels by storing the TV information in form of a storage list and labeling the same with numbers. Referring to the table 1 in particular, for example, when it is desired to switch from the current " Economic Channel" to the " Life Channel" with channel number 25, for most of current remote control apparatuses, it is required to press keys "2" and "5" sequentially and to press the key "5" with a certain period of time (e.g., 0~3 seconds) after the key "2" is pressed, thereby achieving a successful switching to the "** Life Channel" with channel number 25. However, due to the visual attenuation, the aged cannot discern the dense press key functions on the TV remote control apparatus, which makes it more difficult on operation, and the process of pressing keys also becomes relatively slow, failing to press the key of the second number within the required time period; that is, failing to press the key "5" within 3 seconds after the key "2" is pressed, may result that the number "2" is recognized automatically as the target channel number to switch into, and it cannot achieve a successful switching to channel number 25. With the above method, the aged can just press the key "3" to easily perform the action of switching to the channel "25".

Further, said reading channel information of previous channel or next channel of current channel from a storage list and generating an execution instruction for changing channels particularly includes:

reading channel information of a channel next to the current channel from the storage list and generating an execution instruction for channel increasing, if said channel change instruction is the channel increasing instruction; and reading channel information of a channel previous to the current channel from the storage list and generating an execution instruction for channel decreasing, if said channel change instruction is the channel decreasing instruction. Thus, it is possible to make the channel increasing instruction correspond to the next channel and to make the channel decreasing instruction correspond to the previous channel, when the aged change the channels.

Optionally, said preset instructions further include a channel sequence moving instruction so that the sequence of the channels in the storage list can be updated in time and thereby satisfy user's requirements more friendly.

Further, said comparing a signal instruction obtained from the decoding with preset instructions and generating an execution instruction corresponding to the preset instruction as matched particularly includes:

generating an execution instruction for adjusting current channel sequence in the storage list if the signal instruction obtained from the decoding corresponds to the channel sequence moving instruction, wherein said channel sequence moving instruction includes a channel moving upward instruction and a channel moving downward instruction.

Further, said generating an execution instruction for adjusting current channel sequence in the storage list particularly includes:

generating an execution instruction for moving the sequence of the current channel information in the storage list upward one level if the signal instruction obtained from the decoding corresponds to the channel moving upward instruction; and generating an execution instruction for moving the sequence of the current channel information in the storage list downward one level if the signal instruction obtained from the decoding corresponds to the channel moving downward instruction. Thus, it enables the execution instruction for moving the channel information sequence upward one level to correspond to the channel moving upward and the execution instruction for moving the channel information sequence downward one level to correspond to the channel moving downward.

Further, said preset instructions in the embodiment include a channel deleting instruction so that it is convenient to delete the channels that are not watched for a long period of time.

Further, said comparing a signal instruction obtained from the decoding with preset instructions and generating an execution instruction corresponding to the preset instruction as matched particularly includes:

generating an execution instruction for deleting channel information in the storage list if the signal instruction obtained from the decoding corresponds to the channel deleting instruction. Thus, it can judge whether the one obtained from the decoding is a channel change execution instruction or a channel deleting instruction.

It should be noted that the preset instructions can also include a volume increasing/decreasing instruction, and thus in addition to change the received channels according to the signal from the decoding, in the above method, the signal instruction obtained from decoding can be compared with the preset instructions, and if the signal instruction obtained by decoding corresponds to a volume increasing/decreasing instruction, an execution instruction for increasing or decreasing the volume is generated, thereby controlling the volume.

With the signal processing method described above, the specific channels can be stored by applying the method to the field of processing of TV control signals, so that the aged can operate only on these specific TV channels instead of on all TV channels when watching TV programs, and thus it is convenient for them to watch TV programs.

Second Embodiment

Figure 2:
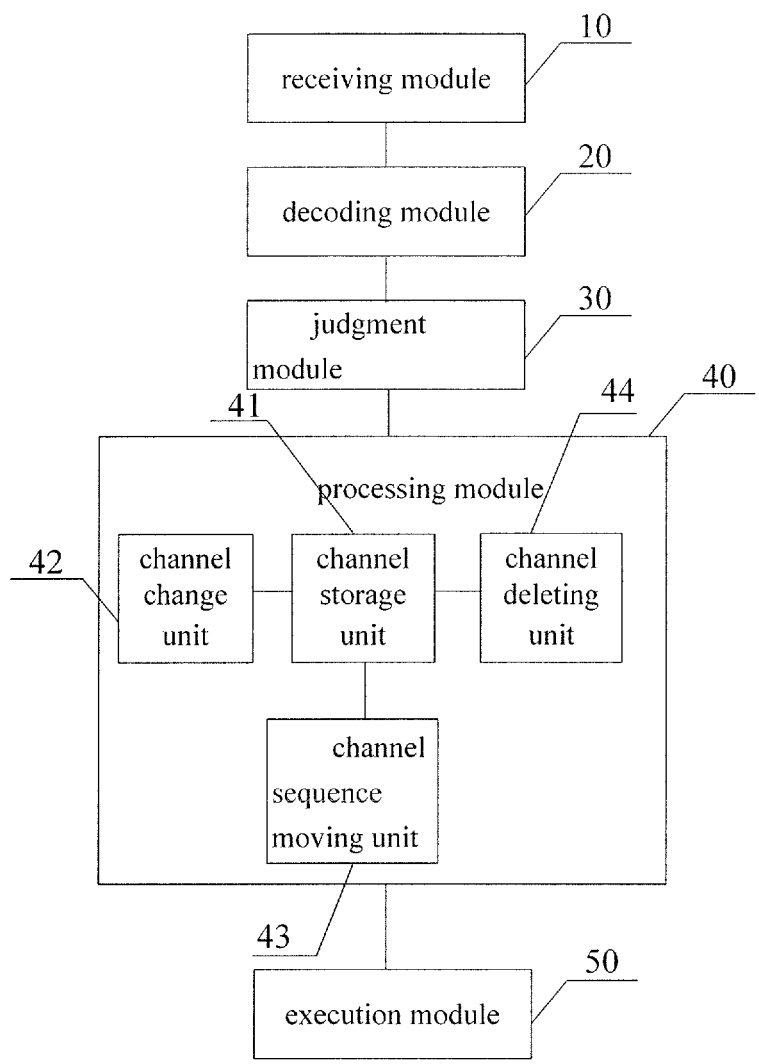
FIG. 2 is a schematic configuration diagram for a signal reception processing apparatus provided by a second embodiment of the present disclosure.

In the second embodiment of the present disclosure, there is further provided a signal reception processing apparatus, whose schematic configuration diagram is illustrated as FIG. 2, including: a receiving module 10, a decoding module 20, a judgment module 30, a processing module 40 and an execution module 50; wherein the receiving module 10 is configured to receive control signals; the decoding module 20 is configured to decode said control signals; the judgment module 30 is configured to compare a signal instruction obtained from the decoding with preset instructions and then to send information obtained by comparison to the processing module 40, wherein said preset instructions include a channel storage instruction and a channel change instruction; the processing module 40 is configured to receive the information sent by the judgment module 30 and generate an execution instruction corresponding to the matched preset instruction, and to send said execution instruction to the execution module 50; and the execution module 50 is configured to execute corresponding execution action after receiving the execution instruction sent by the processing module 40.

With the above signal reception unit, it can be realized that the control signals are received, and then the processing of decoding the control signals and comparing the same are performed to obtain a corresponding execution instruction, and the corresponding execution action is performed according to the execution instruction, thus the specific channels can be stored so that the aged can operate only on these specific TV channels instead of on all TV channels when watching TV programs, and it is convenient for them to watch TV programs.

Optionally, the processing module 40 in the embodiment includes a channel storage unit 41 and a channel change unit 42;

wherein the channel storage unit 41 is configured to generate an execution instruction for storing channel information according to information corresponding to a channel storage instruction among the preset instructions sent by the judgment module 30, and to send the same to the execution module 50; and the channel change unit 42 is configured to read channel information of a channel previous to or a channel next to the current channel from a storage list and generate an execution instruction for changing channels according to information corresponding to a channel change instruction among the preset instructions sent by the judgment module 30, and send the same to the execution module 50, wherein the channel change instructions include a channel increasing instruction and a channel decreasing instruction.

Thus, with the judgment module 30, it can be judged whether the purpose of the signal instruction obtained from the decoding is to store channels or to increase/decrease the current displayed channel number, and then a corresponding instruction is generated; moreover, the aged can change to a previous channel or a next channel for the specific TV channels instead of for all TV channels; in a way of changing channels one by one and storing the specific channel described above, the aged can store the channels they frequently watch, and the time required for changing these frequently-watched channels in the storage list will be less than that for changing all channels.

Note that the reception processing for a signal not only includes the control for channels but also includes an unit configured to control the volume, that is, a volume increasing/decreasing unit configured to generate an execution instruction for volume increasing or decreasing according to the information corresponding to the volume increasing/decreasing instruction in the preset instructions sent by the judgment module 30, and to send the same to the execution module 50.

Further, said channel storage unit 41 is configured to generate a storage list, and when the number of channel information stored in the channel storage unit 41 is large than 2, the channel information is stored in form of a storage list, and in said storage list, the channel information is arranged in an order of adding sequence and labeled with numbers. The specific detail has been described in the first embodiment, and will be omitted herein.

Further, said channel storage unit 41 is configured to read channel information of a channel next to the current channel from the storage list and send the same to the execution module if the channel change instruction is a channel increasing instruction; and to read channel information of a channel previous to the current channel from the storage list and send the same to the execution module if channel change instruction is a channel decreasing instruction. Thus, by the storage unit 41, it can be achieved that the channel information of the channel previous to the current channel and the channel information of the channel next to the current channel in the storage list correspond to the channel decreasing instruction and the channel increasing instruction in the changing instruction respectively, and the corresponding execution instructions are sent out.

Optionally, said preset instructions further include a channel sequence moving instruction. Thus, the sequence of the channels in the storage list can be updated in time so that the user's requirements can be satisfied more friendly.

Further, the processing module 40 in the embodiment includes a channel sequence moving unit 43; wherein the channel sequence moving unit 43 is configured to generate an execution instruction for adjusting current channel sequence in the storage list according to information corresponding to a channel sequence moving instruction in the preset instructions sent by the judgment module 30, and to send the same to the execution module 50, wherein said channel sequence moving instruction includes a channel moving upward instruction and a channel moving downward instruction.

Further, the channel sequence moving unit 43 is also configured to generate an execution instruction for moving current channel information sequence in the storage list upward one level if the channel sequence moving instruction is a channel moving upward instruction, and to send the same to the execution module 50; and to generate an execution instruction for moving current channel information sequence in the storage list downward one level if the channel sequence moving instruction is a channel moving downward instruction, and to send the same to the execution module 50. Thus, users can perform the corresponding actions to move channel sequence upward or downward through the channel upward instruction or the channel downward instruction.

Optionally, said preset instructions in the embodiment further include a channel deleting instruction for users to delete the TV channels which are not watched for a long period of time.

Further, said processing module includes a channel deleting unit 44, channel deleting unit 44 configured to generate an execution instruction for deleting channel information in the storage list according to information corresponding to a channel deleting instruction in the preset instructions sent by the judgment module 30, and to send the same to the execution module 50. Thus, it is convenient for user to delete the channels stored in the storage list which are not watched for long period of time, so that the channel change instruction and the channel deleting instruction can be processed correspondingly, and the corresponding execution instructions are generated.

According to the above, a specific embodiment is given as the following:

First, the receiving module 10 receives a control signal; after the control signal is decoded by the decoding module 20, the decoding module 20 compares the signal instruction obtained by the decoding with the preset instructions; if a channel storage instruction is obtained, the information on the comparison result is sent to the processing module 40; the processing module 40 generates a corresponding channel storage execution instruction and sends the same to the execution module 50 to store the current channel, thereby adding the " Economic Channel" with storage number 1 into the storage list. For the storage list in the channel storage unit 41, the current channel can be labeled according to the sequence of being added into the list. For example, the frequently-watched channels can be stored in the memory, whose numbers are not more than 10 in general; taking 4 as an example, the channel information can be arranged in the storage list according to the order in which the channel information is stored, for example, if the current channel (i.e., channel 12) corresponding to the " Economic Channel" is stored into the channel storage unit, and then the channel 17 corresponding to " Satellite TV" is stored, and then the channel 25 corresponding to " Life Channel" is stored, and at last the channel 33 corresponding to "** Legal Channel" is stored, then a storage list as illustrated in table 1 is obtained.

TABLE 1

| Storage No. | Original Channel No. | Channel Name |
|---|---|---|
| 1 | 12 | ** Economics Channel |
| 2 | 17 | ** Satellite TV |
| 3 | 25 | ** Life Channel |
| 4 | 33 | ** Legal Channel |

After that, the receiving module 10 receives a control signal, and after the signal is decoded by the decoding module 20, the signal instruction obtained by decoding is compared with the preset instruction by the decoding module 20; if a channel change instruction is obtained, the information on the comparison result is sent to the processing module 40, and the processing module 40 generates a corresponding channel increasing execution instruction and sends the same to the execution module 50, and the channel information with a storage list number 3, i.e. " Life Channel", is read from the channel storage unit; if the processing module 40 generates a corresponding channel decreasing instruction, then the execution module 50 reads the channel information with the storage list number 1, "

Economics Channel", from the channel storage unit after receiving the corresponding channel decreasing instruction. It can be seen that it can be realized just by pressing one key of "channel increasing" (or "next channel") that the channel with the original number 17 is switched to the channel with the original number 25, or that it can be realized just by pressing one key of "channel decreasing" (or "previous channel") that the channel with the original number 17 is switched to the channel with the original number 12. In a case in which the channel is stored without the signal reception processing apparatus provided by the embodiment, it is required to switch the channel in a way of pressing directly 25 or 12, or pressing the existing channel decreasing key for many times to realize the switching, so that the operation is complicated and is not simple.

Note that the above storage list takes 4 as an example, but the number of the channels stored in the embodiment is not limited to 4, the number of the channels to be stored can be selected as desired, which is not more than 10 in general, but it can also be expanded according to the specific requirements, to facilitate reading the channel information from the channel storage unit.

Besides adding channel information into the storage list, the channel information stored in the storage list can also be deleted or moved in sequence. Still taking the storage list in the above table 1 as an example, if it is expected that the channel of " Satellite TV" will be no longer stored after a period of time, the channel of " Satellite TV" can be deleted from the list by sending a remote control instruction for deleting this channel; or depending on personal preferences, it is desired to switch the channel to the channel of " Life Channel" habitually after the programs of " Economics Channel" are watched, it needs to press the channel increasing key for 2 times to switch to the "Life Channel" according to the storage sequence in table 1; if it is desired to switch to the channel of " Life Channel" by pressing the channel increasing key only once all the time, the storage sequence between the channel of " Satellite TV" and "** Life Channel" can be adjusted by sending an instruction with the remote control apparatus, and the adjusted storage list is illustrated in table 2. With the flexible adjustment for the channels, appropriate adjustment and change can be done to the channels in the memory according to one's own preferences.

TABLE 2

| Storage No. | Original Channel No. | Channel Name |
| --- | --- | --- |
| 1 | 12 | ** Economics Channel |
| 2 | 25 | ** Life Channel |
| 3 | 17 | ** Satellite TV |
| 4 | 33 | ** Legal Channel |

Further, the receiving module 10 receives a control signal, and after the control signal is decoded by the decoding module 20, the decoding 20 compares the signal instruction obtained by decoding with the preset instructions, and if a volume increasing instruction is obtained, the information on comparison result is sent to the processing module 40, and the processing module 40 generates a corresponding volume increasing execution instruction, and then the execution module 50 increases the volume; if a volume decreasing instruction is obtained, the information on the comparison result is sent to the processing module 40, and the processing module 40 generates a corresponding volume decreasing execution instruction, then the execution module 50 decreases the volume.

Figure 3:
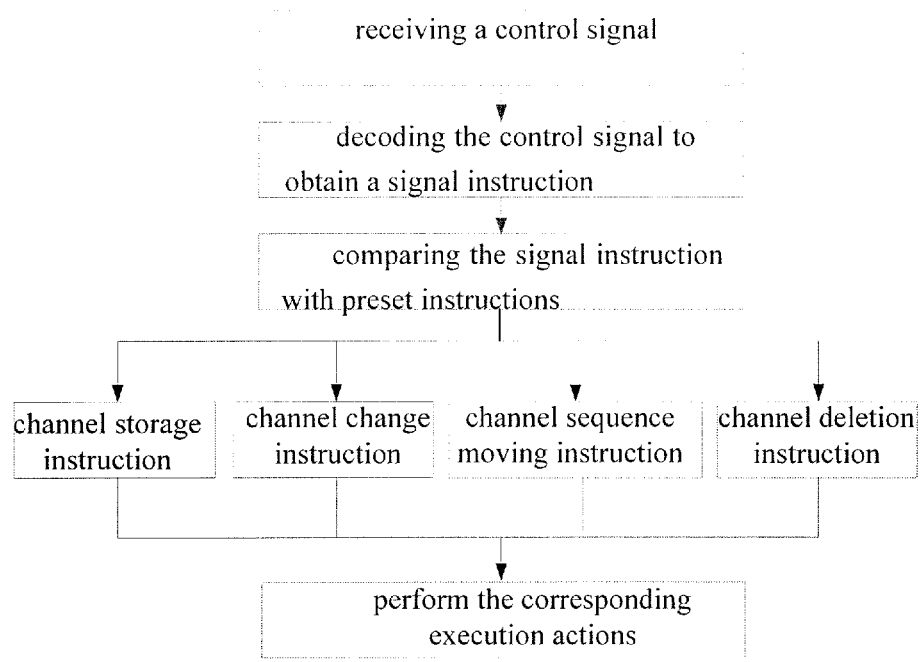
FIG. 3 is a flow chart for the processing of a control signal by the signal reception processing apparatus provided by the second embodiment of the present disclosure.

The flow chart of the above processing for the control signal by the signal reception processing apparatus is illustrated as FIG. 3. First, a control signal is received, and then the control signal is decoded to obtain a signal instruction; this signal instruction is compared with the preset instruction, and thus five results can be obtained: the first is a channel storage instruction, the second is a channel change instruction, the third is a volume increasing/decreasing instruction, the fourth is channel sequence moving instruction and the fifth is a channel deleting instruction. Then, the corresponding execution actions are performed according to the respective instructions.

In a summary, in the signal reception processing apparatus provided by the embodiment, the received control signal is decoded, and some specified channels are stored according to the requirements; thus, by storing the specific channels, the aged can operate only on these specific TV channels instead of all TV channels when watching TV programs so that it is convenient for the aged to watch TV programs. In particular, an user can switch the channel to the previous channel or the next channel for the specific TV channels instead of for all the TV channels; in a case in which the channel is switched in a way of changing channels one by one, the specific channel are stored as described above, so that the aged can store the channels they frequently watch, and the time required for switching these frequently-watched channels in the storage list will be less than that for switching channel in all the channels; moreover, the user can change channels in a way of pressing numerical keys, and since the specific channels have been stored in the storage list (the number of channels in the list is not more than 10 in general), the user can only press one digital of number to change the current channel with the desired channel, avoiding the inconvenience for the aged to operate on the TV channels in the case that two digitals of the number keys (or more) are required to be pressed within a certain time interval when the number of channels is relatively large (tens or more in general).

The Third Embodiment

Figure 4:
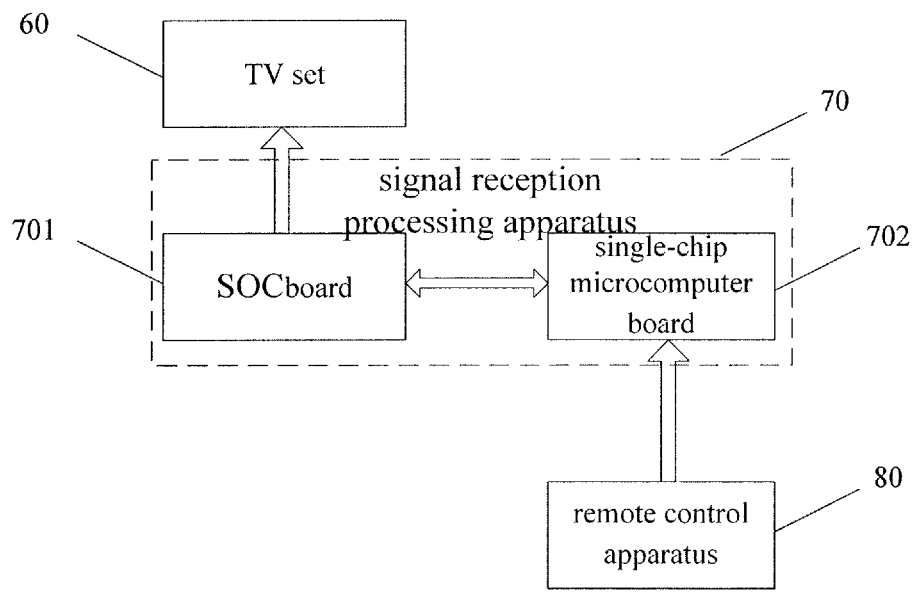
FIG. 4 is a schematic configuration diagram for a TV system provided by a third embodiment of the present disclosure.

The third embodiment of the present disclosure further provides a TV system, whose schematic configuration diagram is illustrated as FIG. 4, including a TV set 60, and said TV set includes any one of the signal reception processing apparatus 70 as described above, the TV set 60 executes execution instructions corresponding to control signals with said signal reception processing apparatus 70 to control channels. By storing the specific channels, the aged can operate on these specific TV channels instead of all TV channels when watching TV programs, and thus they can watch TV programs conveniently.

Optionally, the TV system of the embodiment further includes a remote control apparatus 80, and the remote control apparatus 80 is configured to send control signal to the TV set to provide a source for the signal.

Optionally, the remote control apparatus 80 in the embodiment matches the above TV set 60, including a casing and a key array on the casing, the key array being divided into usage area 81 and storage area 82, wherein the storage area 82 includes a search key, a store key, a confirm key and a cancel key; wherein during the process of storing channels, the storage is done with the confirm key if the selected channels comply with the desired channels, while the storage is cancelled with the cancel key when the channel is selected in error and does not comply with the desired channels, thereby facilitating the operations of the users in various modes.

Optionally, the keys in the storage area of the remote control apparatus in the present embodiment further include a delete key, which facilitates the deletion operation of the user on the channels.

Optionally, a sliding cover is provided above the storage area 82 in the embodiment, the sliding cover is away from the storage area 82 by sliding in a storage mode, while in a usage mode, it slides above the storage area 82 and covers the keys in the storage area 82, so that the aged will not be affected by the keys for channel storage when performing the operations such as channel change or volume increasing/decreasing at the time of watching TV channels.

Optionally, key array in the present embodiment further includes mode switching key (not illustrated in the figure) for realizing the switching between the storage mode and the usage mode.

Figure 5:
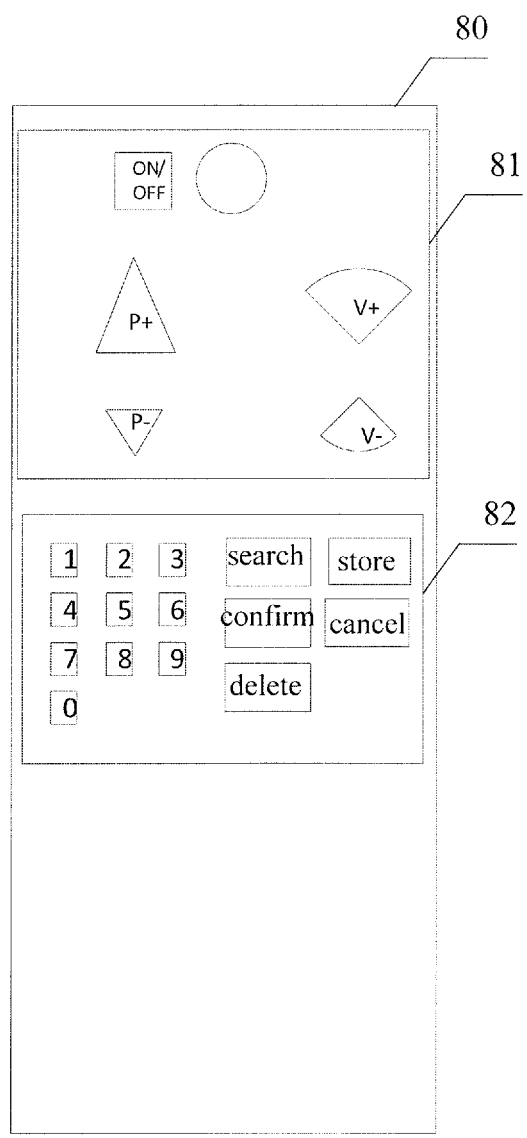
FIG. 5 is a front view of the panel of a remote control apparatus in a storage mode, provided by the third embodiment of the present disclosure.

In the storage mode, the searched channels is stored which complies with a preset condition, and the search is continued with channel increasing key or channel decreasing key after one channel is stored. The front view of the remote control apparatus in the storage mode is illustrated in FIG. 5, wherein the usage area 81 includes five basic keys of ON/OFF, channel increasing P+, channel decreasing P−, volume increasing V+, and volume decreasing V−; and the storage area 82 includes a search key, a store key, a confirm key and a cancel key. Further, the number keys of 0-9 are further provided on the panel of the remote control apparatus, and in the present embodiment, as an example, the number keys are arranged in the storage area 82, but it should be noted that these keys can be set in either usage area or storage area depending on requirements, which is not limited hereto.

Figure 6:
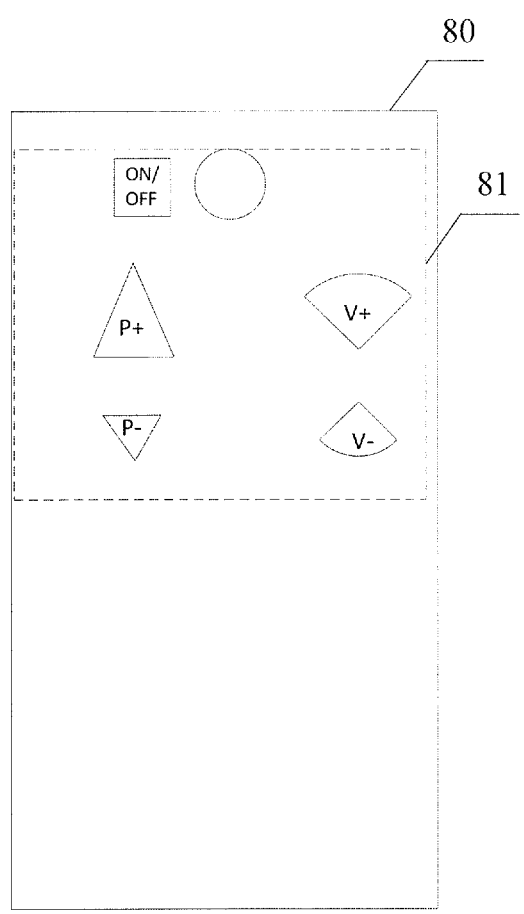
FIG. 6 is a front view of the panel of the remote control apparatus in an usage mode, provided by the third embodiment of the present disclosure.

In the usage mode, switching of channels is done with the keys for channel increasing or channel decreasing. The front view of the remote control apparatus in such a mode is illustrated in FIG. 6, and it is sufficient for the usage area 31 to have five basic keys of ON/OFF, channel increasing P+, channel decreasing P−, volume increasing V+, and volume decreasing V−. The keys except for these five basic keys can be shielded by the sliding cover as designed, and it will not be uncovered unless the storing operation in the storage mode. Of course, other ways can be used to shield the keys except for these five basic keys to facilitate users to send the control signal with said remote control apparatus.

Further, the illustrated remote control apparatus limits and adjusts the channels and the number of the channels as stored in the storage mode.

It should be noted that designs of different styles can be used for the shapes of the keys on the remote control apparatus. As illustrated in FIG. 5 and FIG. 6, the sizes of the channel increasing key and the volume increasing key are bigger than those of the channel decreasing key and the volume decreasing key, and of course can be of other graphics.

With the remote control apparatus provided by this embodiment, the design for the keys on the panel of the remote control apparatus is simplified and moreover the operation is further simplified, so that it is more convenient for the aged to use.

The above signal reception processing apparatus can be applied to the TV set, and can also be applied to the other apparatus for receiving and executing control signals. In the embodiment, a case in which the signal reception processing apparatus is applied to the TV set is taken an example, with incorporation of one single-chip microcomputer board in the TV set, the remote control apparatus 80 sends a control signal, the single-chip microcomputer board 701 in the signal reception processing apparatus 70 receives and decodes the control signal and compares it with the preset instructions to obtain the control instruction of channel deleting instruction, channel change instruction, channel sequence moving instruction, channel deleting instruction and volume increasing/decreasing instruction etc., and then the single-chip microcomputer board 701 sends the control instruction to the SOC (System On Chip, a micro-processing system) board 702 where the corresponding execution instruction is generated; the execution instruction will be sent to the TV set 60 by the SOC board 702 to realize the channel switching and volume adjustment for the TV set. In FIG. 3, a protocol such as Inter-Integrated Circuit (IIC) or Serial Peripheral Interface (SPI) is used for communication between the single-chip microcomputer board and the SOC board. In general, the instruction is transmitted via the infrared between the remote control apparatus and the single-chip microcomputer board, and since the manner in which the receiving and decoding of the infrared is the same as that of the existing remote control apparatus, the details are omitted herein.

The above embodiments are only for describing the present disclosure, instead of limiting the present invention. Those skilled in the art can make various modifications and variations without departing from the spirit and scope of the present disclosure, and therefore all the equivalent technical solutions also belongs to the scope of the present disclosure, and the scope sought for patent protection by the preset disclosure is defined by the claims.

What is claimed is:

1. A method for controlling channels of a TV set, comprising:
   receiving a control signal from a remote control apparatus and decoding said control signal by a first microprocessor to obtain a signal instruction for controlling the TV set;
   comparing, by the first microprocessor, the signal instruction with preset instructions to obtain a control instruction to be transmitted to a second microprocessor, wherein said preset instructions comprise a channel storage instruction and a channel change instruction; wherein the control instruction for controlling the channels of the TV set is transmitted from the first microprocessor to the second microprocessor via an Inter-Integrated Circuit (IIC) protocol;
   generating, by the second microprocessor, an execution instruction corresponding to the control instruction, and sending the execution instruction to the TV set so as to control the channels of the TV set;
   wherein if the signal instruction obtained from the decoding corresponds to the channel storage instruction, the controlling instruction for storing channel information is transmitted from the first microprocessor to the second microprocessor via the Inter-Integrated Circuit protocol, and an execution instruction for storing channel information is generated by the second microprocessor so that only TV channels corresponding to the stored channel information can be operated upon watching TV programs.

2. The method of claim 1, wherein
   channel information of previous channel or next channel of current channel is obtained from a storage list and an execution instruction for changing channels is generated by the second microprocessor, if the signal instruction obtained from the decoding corresponds to the channel change instruction, wherein said channel change instruction comprises channel increasing instruction and channel decreasing instruction.

3. The method of claim 2, wherein,
the channel information is stored in a memory in form of a storage list when the number of channel information as stored is larger than 2, and the channel information is arranged in an order of adding sequence in said storage list and the channel information is labeled with numbers.

4. The method of claim 2, wherein
channel information of next channel of current channel is read from the storage list and an execution instruction for channel increasing is generated by the second microprocessor, if said channel change instruction is the channel increasing instruction; and
channel information of previous channel of current channel is read from the storage list and an execution instruction for channel decreasing is generated by the second microprocessor, if said channel change instruction is the channel decreasing instruction.

5. The method of claim 1, wherein said preset instructions further comprise a channel sequence moving instruction.

6. The method of claim 5, wherein
an execution instruction for adjusting current channel sequence in the storage list is generated by the second microprocessor if the signal instruction obtained from the decoding corresponds to the channel sequence moving instruction, wherein said channel sequence moving instruction comprises a channel moving upward instruction and a channel moving downward instruction.

7. The method of claim 6, wherein
an execution instruction is generated by the second microprocessor for moving current channel information sequence in the storage list upward one level if the signal instruction obtained from the decoding corresponds to the channel moving upward instruction; and
an execution instruction is generated by the second microprocessor for moving current channel information sequence in the storage list downward one level if the signal instruction obtained from the decoding corresponds to the channel moving downward instruction.

8. The method of claim 1, wherein said preset instructions further comprise a channel deleting instruction.

9. The method of claim 8, wherein
an execution instruction is generated by the second microprocessor for deleting channel information in the storage list if the signal instruction obtained from the decoding corresponds to the channel deleting instruction.

10. An apparatus for controlling channels of a TV set, the apparatus comprising a first microprocessor and a second microprocessor;
wherein the first microprocessor is configured to receive a control signal from a remote control apparatus and decode said control signal to obtain a signal instruction for controlling the TV set;
the first microprocessor is further configured to comparing the signal instruction with preset instructions to obtain a control instruction to be transmitted to the second microprocessor, wherein said preset instructions comprise a channel storage instruction and a channel change instruction; the control instruction for controlling the channels of the TV set is transmitted from the first microprocessor to the second microprocessor via an Inter-Integrated Circuit (IIC) protocol;
the second microprocessor is configured to generate an execution instruction corresponding to the control instruction and send the execution instruction to the TV set so as to control the channels of the TV set;
wherein if the signal instruction obtained from the decoding corresponds to the channel storage instruction, the first microprocessor is configured to transmit the controlling instruction for storing channel information to the second microprocessor via the Inter-Integrated Circuit protocol, and the second microprocessor is configured to generate an execution instruction for storing channel information so that only TV channels corresponding to the stored channel information can be operated upon watching TV programs.

11. The apparatus of claim 10, wherein,
the second microprocessor is configured to obtain channel information of previous channel or next channel of current channel from a storage list and generate an execution instruction for changing channels, if the signal instruction obtained from the decoding corresponds to the channel change instruction, wherein said channel change instruction comprises channel increasing instruction and channel decreasing instruction.

12. The apparatus of claim 11, wherein the second microprocessor is configured to generate a storage list, and to store the channel information in a memory in form of the storage list when the number of channel information as stored is larger than 2, wherein the channel information is arranged in an order of adding sequence in said storage list and is labeled with numbers.

13. The apparatus of claim 11, wherein the second microprocessor is configured to:
read channel information of next channel of current channel from the storage list if the channel change instruction is a channel increasing instruction, and to send the channel information of said next channel to the TV set; and
read channel information of previous channel of current channel from the storage list if the channel change instruction is a channel decreasing instruction, and to send channel information of said previous channel to the TV set.

14. The apparatus of claim 10, wherein said preset instructions further comprise a channel sequence moving instruction.

15. The apparatus of claim 14, wherein the second microprocessor is configured to generate an execution instruction for adjusting current channel sequence in the storage list according to information corresponding to a channel sequence moving instruction in the preset instructions, and to send the same to the TV set, wherein said channel sequence moving instruction comprises a channel moving upward instruction and a channel moving downward instruction.

16. The apparatus of claim 15, wherein the second microprocessor is further configured to:
generate an execution instruction for moving current channel information sequence in the storage list upward one level if the channel sequence moving instruction is the channel moving upward instruction, and send the same to the TV set; and
generate an execution instruction for moving current channel information sequence in the storage list downward one level if the channel sequence moving instruction is the channel moving downward instruction, and send the same to the TV set.

17. The apparatus of claim 10, wherein said preset instructions further comprise a channel deleting instruction.

18. The apparatus of claim 17, wherein the second microprocessor is configured to generate an execution instruction for deleting channel information in the storage list according to information corresponding to a channel deleting instruction in the preset instructions, and send the same to the TV set.

19. A TV system comprising a TV set into which an apparatus for controlling channels of the TV set is integrated,
wherein the apparatus comprises a first microprocessor and a second microprocessor;
wherein the first microprocessor is configured to receive a control signal from a remote control apparatus and decode said control signal to obtain a signal instruction for controlling the TV set;
the first microprocessor is further configured to comparing the signal instruction with preset instructions to obtain a control instruction to be transmitted to the second microprocessor, wherein said preset instructions comprise a channel storage instruction and a channel change instruction; the control instruction for controlling the channels of the TV set is transmitted from the first microprocessor to the second microprocessor via an Inter-Integrated Circuit (IIC) protocol;
the second microprocessor is configured to generate an execution instruction corresponding to the control instruction and send the execution instruction to the TV set so as to control the channels of the TV set;
wherein if the signal instruction obtained from the decoding corresponds to the channel storage instruction, the first microprocessor is configured to transmit the controlling instruction for storing channel information to the second microprocessor via the Inter-Integrated Circuit protocol, and the second microprocessor is configured to generate an execution instruction for storing channel information so that only TV channels corresponding to the stored channel information can be operated upon watching TV programs.

20. The TV system of claim 19, wherein the second microprocessor is configured to obtain channel information of previous channel or next channel of current channel from a storage list and generate an execution instruction for changing channels, if the signal instruction obtained from the decoding corresponds to the channel change instruction, wherein said channel change instruction comprises channel increasing instruction and channel decreasing instruction.

* * * * *